FLOW TABLE LOGIC PATTERN RECOGNIZER

Filed Oct. 31, 1960 4 Sheets-Sheet 1

INVENTORS
EDWARD J. SKIKO
PAUL R. LOW
BY Carl C. Kling
ATTORNEY

FLOW TABLE LOGIC PATTERN RECOGNIZER

Filed Oct. 31, 1960 4 Sheets-Sheet 3

July 19, 1966 E. J. SKIKO ET AL 3,262,099

FLOW TABLE LOGIC PATTERN RECOGNIZER

Filed Oct. 31, 1960 4 Sheets-Sheet 4

RECOGNITION PLANE

United States Patent Office 3,262,099
Patented July 19, 1966

3,262,099

FLOW TABLE LOGIC PATTERN RECOGNIZER

Edward J. Skiko, Poughkeepsie, N.Y., and Paul R. Low, Palo Alto, Calif., assignors to International Business Machines Corporation, New York, N.Y., a corporation of New York Filed Oct. 31, 1960, Ser. No. 66,299
10 Claims. (Cl. 340—146.3)

This invention relates to electronic logic, and more particularly to automatic-organizable pattern recognition logic.

Character or pattern recognition by machines has captured the interest of the data processing industry; pattern recognition machines show promise of relieving humans of the task of preparing special machine-readable documents such as punched cards, etc., by converting the printed page to machine language signals.

The great variety of patterns readable by the flexible eyes and brain of the average human presents a terrific problem to any machine. For example, a human reads italics, bold face and Roman print interchangeably, while a separate machine must be designed (or the same machine specially readjusted) to recognize the same pattern in each of these different type fonts. Groups of patterns even within the limited range of the machine must generally follow specific rules or be illegible. Even with special type fonts and strict ground rules pattern recognition is generally limited to the ten decimal digits.

A data processor-character scanner system may have capability of determining the size of type, style and certain other characteristics of its input document. But reorganization of the data processor upon such recognition is either costly in time or through provision of alternative special-purpose circuits for each style of input. Reorganization of a stored program processor, by branching to a different program, is difficult because of the complexity of pattern recognition programs and processor time required.

The first object of the invention, therefore, is to provide automatic organizing capability to a pattern recognizer.

Pattern recognition is such a varied task that it can best be handled by a sequential circuit. Such a circuit treats the complex pattern as a standard sequence of partial patterns or patternettes; logical input is parallel by patternette. This is especially well adapted for use with pattern scanners, which can treat a pattern as a matrix to be scanned column by column, in a sequence of patternettes, each comprising several samples (bits) in parallel by row.

By definition, a sequential circuit is one in which the present output is a function not only of the present inputs, but also the past history of these inputs. D. A. Huffman has suggested that a chart, called a flow table, be used to record the sequences of these past input conditions and to define the operation of the desired circuitry.

In essence, the flow (or sequence of switching) is down a chart which has a series of horizontal rows of boxes formed by intersecting horizontal and vertical lines. The boxes are designated as to function by column position. The usual sequential switching mechanism, at any point in its operation, infers a past history, exhibits a present condition by row position, and retains a possibility of plural future conditions. Choice of future condition depends upon present conditions and input, by row position and column input. The flow table illustrates history by numbering—it is usual to have a stable state for each row or period of history, and a switching or unstable state intervening between each two stable states.

Virtually all possible sequential switching problems are susceptible to flow table description. A flip-flop multivibrator, or scale-of-two counter, for example, is a device which may be described in a four-level table of eight blocks, as follows:

Historical Level at Unstable Point

| | | |
|---|---|---|
| (1) | 2 | Input and Output |
| 3 | (2) | Not Input and Output |
| (3) | 4 | Input and Not Output |
| 1 | (4) | Not Input and Not Output |

Unstable State: 1 2 3 4 Input: − + − +.
Stable State: (1) (2) (3) (4) Output: − + + −.

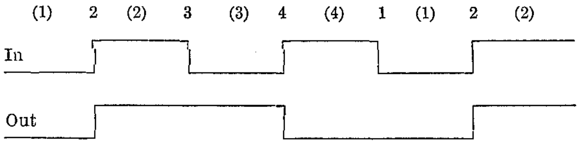

In the simplest form of a scale of two counter of multivibrator type, the input alternates at fixed frequency. The output alternates at half the input frequency. There is a stable state in which both input and output are deconditioned, and other stable states where one or the other or both input and output are conditioned. A switching function occurs for each change of state, as follows:

(1) Output remains deconditioned.
2 Input conditioned to condition output.
(2) Output remains conditioned.
3 Input deconditioned.
(3) Output remains conditioned.
4 Input conditioned to decondition output.
(4) Output remains deconditioned.
1 Input deconditioned.

The flow table thus developed describes the sequential switching device accurately, without ambiguity, repetition or gaps. A set of standard manipulations involving this chart has been developed as a means of deriving the proper Boolean expressions for implementing the desired circuitry. A method of implementation which bypasses all of these manipulations has been suggested by R. J. Domenico, P. R. Low and G. A. Maley.

This method, termed flow table logic, provides a technique for implementing the desired circuitry in a physical configuration directly analogous to the logical flow table configuration, rather than in the standard AND-OR form. The advantages of this technique lie in the fact that the circuitry is amendable to batch fabrication, thus emphasizing simplicity and regularity. Ease of circuit design is provided, and an increase in circuit speed is attained.

If a pattern is defined as a group of sequentially scanned multi-bit patternettes the pattern recognition is a sequential problem. By associating each column of the flow table with a different one of the patternettes which could possibly comprise the pattern, recognition will consist of moving the stability condition through the correct path of the flow table. If one or more of the patternettes which is scanned is not the same as the corresponding patternette of the desired pattern, the stability condition will not follow the correct path and recognition will not be achieved.

The concept of the flow table is directly applicable to pattern recognition. However, rather than permanently wiring the circuit to recognize only a single pattern, it is desired to provide facility to change the pattern to be recognized at any time in a simple manner. This requires some changes in the standard flow table.

Flow table logic, a system of synthesizing complex sequential logical circuits, has been disclosed in U.S. patent application Serial No. 46,149, Flow Table Logic, filed July 29, 1960, by Robert J. Domenico, Paul R. Low and Gerald A. Maley, which was abandoned in favor of continuation application Serial Number 111,422, filed May 16, 1961. This invention, which shares an inventor and has the same assignee, provides another dimension to flow table logic to make it subject to automatic organization.

A second object of the invention, therefore, is to improve flow table logic to provide automatic organization.

The invention is an automatic-organizable pattern recognizer comprising a scanner, a data processor, an organization plane, and an array of pairs of memory planes and pattern flow table planes related respectively to each pattern to be recognized. The processor, during the first of several organization cycles, provides a sequence of signals relating to the desired first recognition pattern. These signals condition organization control devices in the organization plane. The organization control devices, in time sequence controlled by the processor, condition memory control devices in the first memory plane associated with the first patern. The data processor then enters a second organization cycle, providing organization to a second memory plane associated with a second pattern, etc., until a memory plane is organized for each recognition pattern. Each memory plane is paired with a related pattern flow table plane; each memory control device conditions twin setup control devices in the related flow table. The setup control devices provide twin switching type and bistable type flow table logic circuits which are effective during appropriate (patternette input and sequence) conditioning to transfer stability to the following sequential level. The switching type circuit is sometimes referred to as a flow table logic DIRECTOR circuit, the bistable type circuit as a flow table logic RETAINER circuit.

After organization time, the processor enters a first recognition cycle. A document pattern is scanned, coded and applied simultaneously in a standard sequence of patternette signals to the array of flow table planes. At the end of the standard sequence, the pattern flow table plane organized to respond to the patternette signal sequence of the document pattern conditions its recognition line for response to the data processor. Should none of the pattern flow table planes respond, the data processor can proceed to reorganize the array of pattern flow table planes during a second organization cycle. The pattern may then be scanned a second time, for recognition by the newly-organized array of pattern flow table planes.

A feature of the invention is a hierarchy of logical matrix planes, in which an organization plane responsive to a data processor sets up a memory plane which in turn organizes a flow table plane to perform its logical function.

A second feature of the invention is a pattern recognition system of a scanner, data processor and photologic planes which are electrically independent but optically coupled. An organization plane of luminors, and an array of pairs of memory planes and respectively related flow table planes are used. The organization plane is responsive to the data processor; in the organization plane, a plurality of organization luminors are operated. The organization luminors illumine processor-selected photoconductors which complete circuits to memory luminors in a first memory plane, then other photoconductors which complete circuits to memory luminors in a second memory plane, and so forth. The memory luminors, once set, remain set until erased. Each memory luminor, when set, illumines twin setup photoconductors in its associated position of the related flow table; the setup photoconductors form related flow table switching type and bistable type circuits, respectively.

An advantage of the flow table logic pattern recognizer is its multiple organization capability which allows a group of basic logical devices to be organized in differing logical arrays under automatic control.

The invention provides for an attempt to recognize a character of a first type font, i.e., Roman, followed if necessary by an attempt to recognize the character in italic, then in bold face, etc., utilizing an array of pattern recognition circuits equal in number to the number of patterns (characters in the chosen alphameric language alphabet).

The foregoing and other objects, features and advantages of the invention will be apparent from the following more particular description of a preferred embodiment of the invention, as illustrated in the accompanying drawings.

Figure 3A:
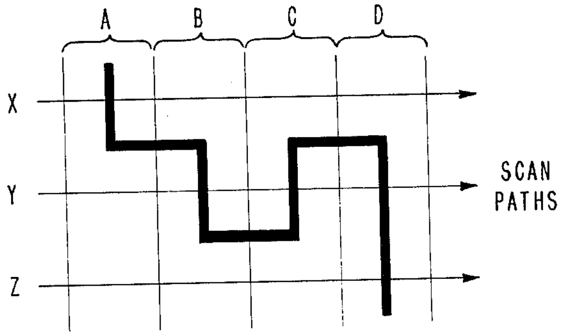
Figure 3B:
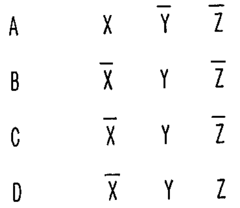
Figure 3C:
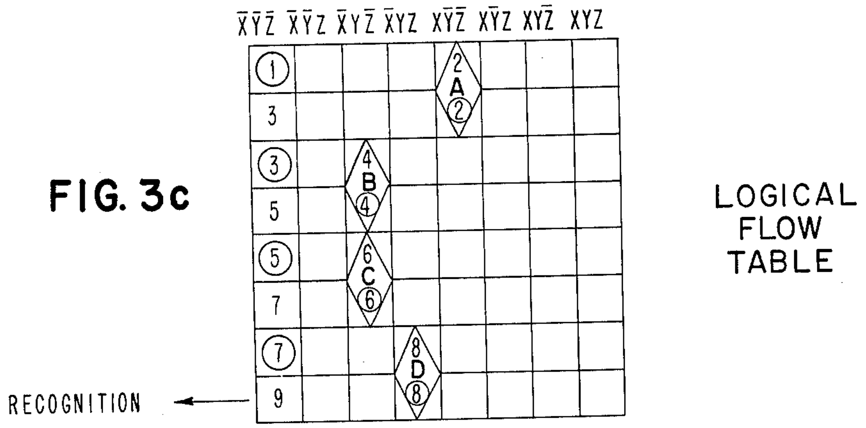

FIGURES 3*a*–3*c* illustrate an example which is carried through FIGS. 1, 4, 5 and 6. FIG. 3*a* illustrates scanning action in connection with a random pattern example. FIG. 3*b* illustrates scanning action in connection with a random pattern example. FIG. 3*b* illustrates the patternette sequence for the random pattern. FIG. 3*c* is a logical flow table for the recognition sequence of the random pattern.

Figure 4:
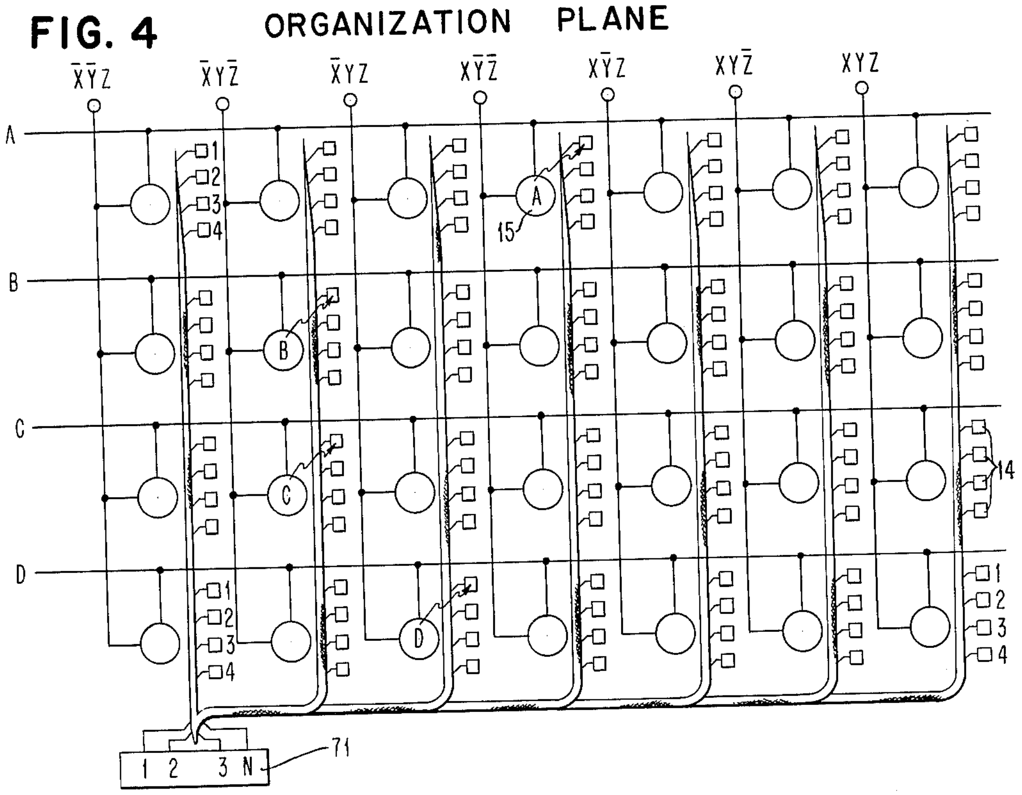

FIG. 4 is a detail diagram of the Organization Plane, organizing for the random pattern example.

Figure 5:
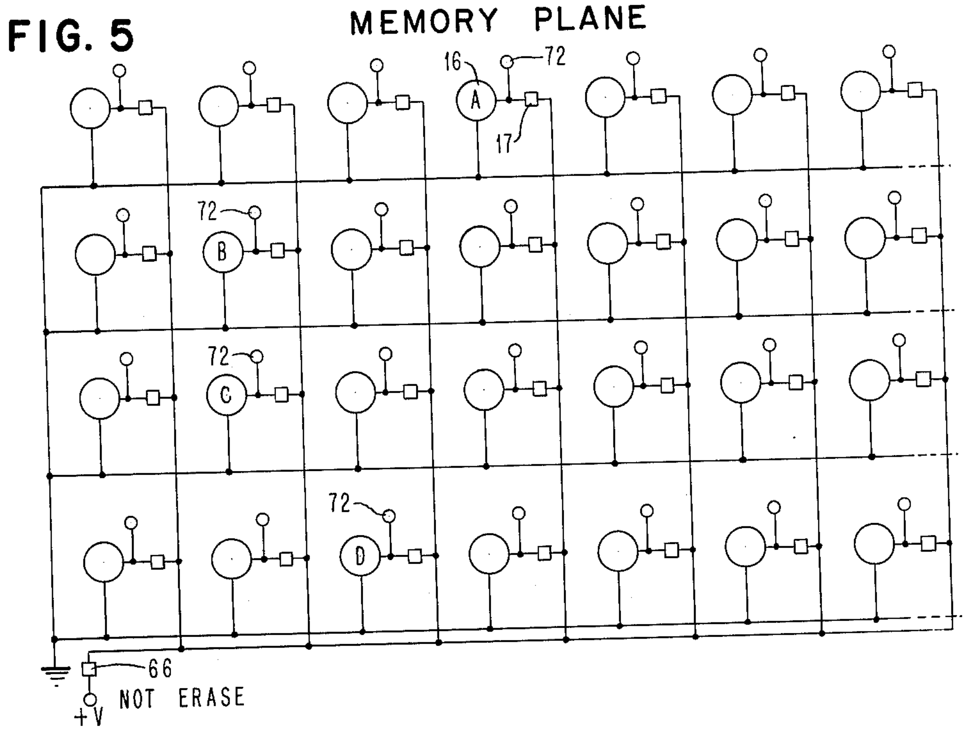

FIG. 5 is a detail diagram of a representative memory plane, organized for the random pattern example.

Figure 6:
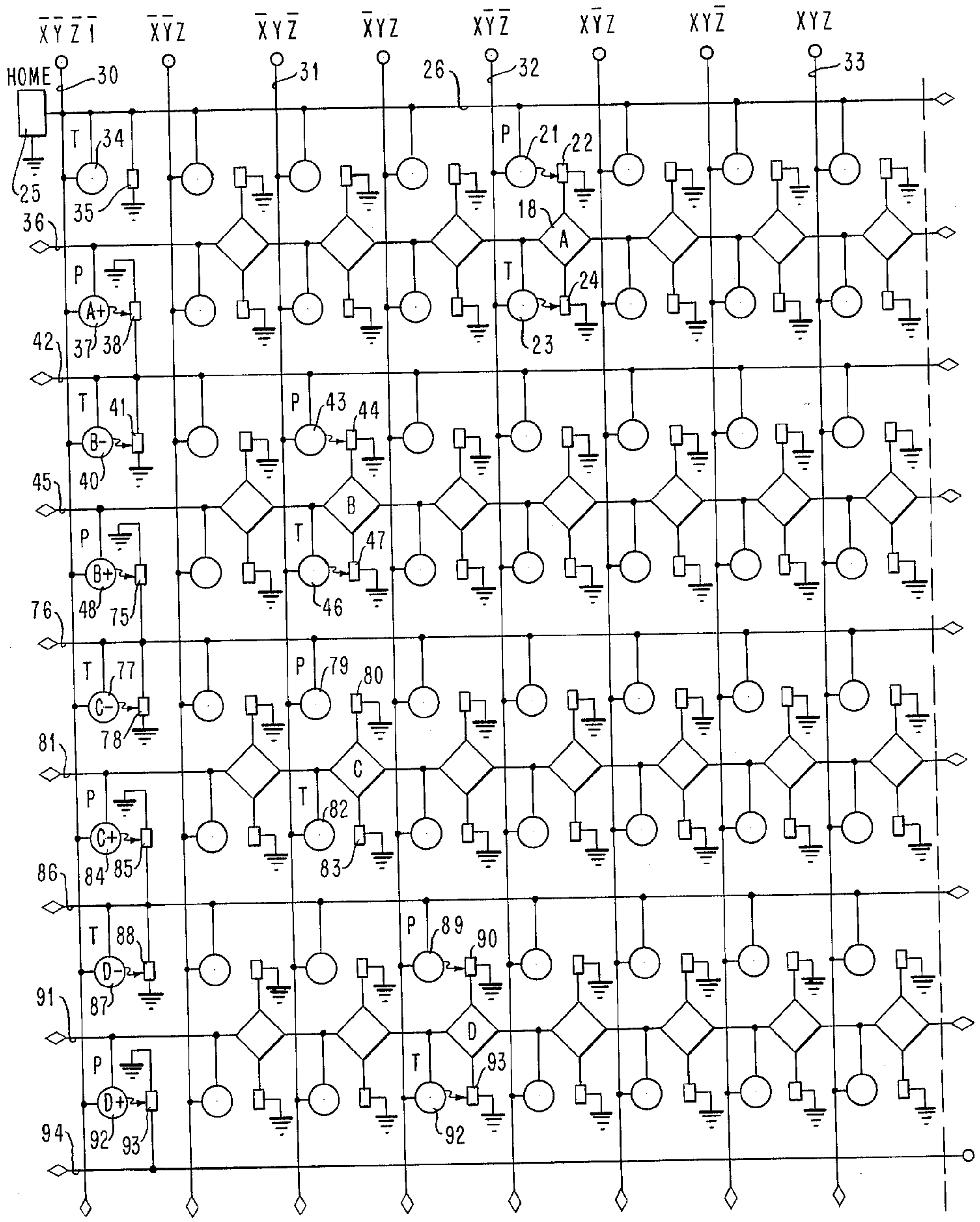

FIG. 6 is a detail diagram of the pattern flow table plane related to the memory plane of FIG. 5, organized to recognize the random pattern example.

DEFINITIONS (1) *Flow table logic.*—A method of implementing a desired sequential switching mechanism accurately without ambiguity ,repetition or gaps, using a switching type circuit (PUT circuit) for directing a stability condition to a bistable type circuit (TAKE circuit) in responding to a history indicated by a previous TAKE circuit and a present condition-indicating signal. U.S. Patent application Serial No. 46,149, filed July 29, 1960. Flow Table Logic, Robert J. Domenico, Paul R. Low and Gerald A. Maley, describes flow table logic.

(2) *Flow table logic PUT circuit.*—A flow table circuit which directs transfer of a stability condition from one TAKE circuit to another TAKE circuit in response to a condition-indicating signal.

(3) *Flow table logic TAKE circuit.*—A stable flow table circuit conditionable by a preceding PUT circuit to retain stability indefinitely and thus indicate the sequential history of the flow table logic sequential mechanism.

(4) *PUT-TAKE pair.*—A flow table logic TAKE circuit and a directly related flow table logic PUT circuit which directs stability to the TAKE circuit.

(5) *Quiescent flow table circuit.*—A flow table circuit which is present in the sequential switching device but which is not currently arranged to manipulate a stability condition.

(6) *Pattern.*—A form having discernible characteristics providing a unique identity when contrasted to other patterns. For example, character T has a unique identity when contrasted with all other letters of the alphabet.

(7) *Patternette.*—Diminutive of pattern; a segment or a portion of a pattern which may have unique characteristics but which cannot be depended upon to define the pattern of which it is a part.

(8) *Organization plane means.*—A subcombination of active and passive elements generally in matrix form. The passive elements when conditioned by externally applied signals in coincidence cause active elements to exhibit a selective pattern of activity which is useful by other subcombinations as basic organization control.

(9) *Pattern memory plane.*—A cubcombination of active and passive elements generally in matrix form matching a related organization plane means in such fashion that the organization plane means can instigate bistable action of the active and passive elements. Once this bistable activity occurs, the elements retain a pattern of activity which is useful in other combinations of the sequential mechanism.

(10) *Pattern flow table plane.*—Recognition plane—a subcombination of flow table logic PUT and TAKE circuits generally arrayed in quiescent PUT-TAKE pairs which are activated by related bistable portions of the memory plane to form a sequential flow table logic circuit having characteristics dictated by the organization of the memory plane.

(11) *Organization switching device.*—A multiple selection switch responsive to selectively applied external stimuli to provide a selective output.

(12) *Memory bistable device.*—A bistable device forming part of the memory plane (see definition 9) responsive to a related organization switching device in the organization plane to provide an indefinite-duration output.

(13) *Home row conductor.*—A conductor within the matrix forming the pattern flow table plane (see definition 10) which carries the initial stability condition of the sequential circuit.

(14) *Sequence row conductor.*—Any one of the several row conductors of the pattern flow table plane (see definition 10) other than the home row conductor. Each sequence row conductor carries the stability condition of the flow table logic circuit only during an assigned era in the sequential history of the device.

(15) *Patternette column line.*—A column line of the pattern flow table plane (see definition 10) which for the current organization includes a patternette—representing stability position.

(16) *Row-patternette column line.*—A column line of the pattern flow table plane (see definition 10) which for the current organization includes no stability position.

Figure 1:
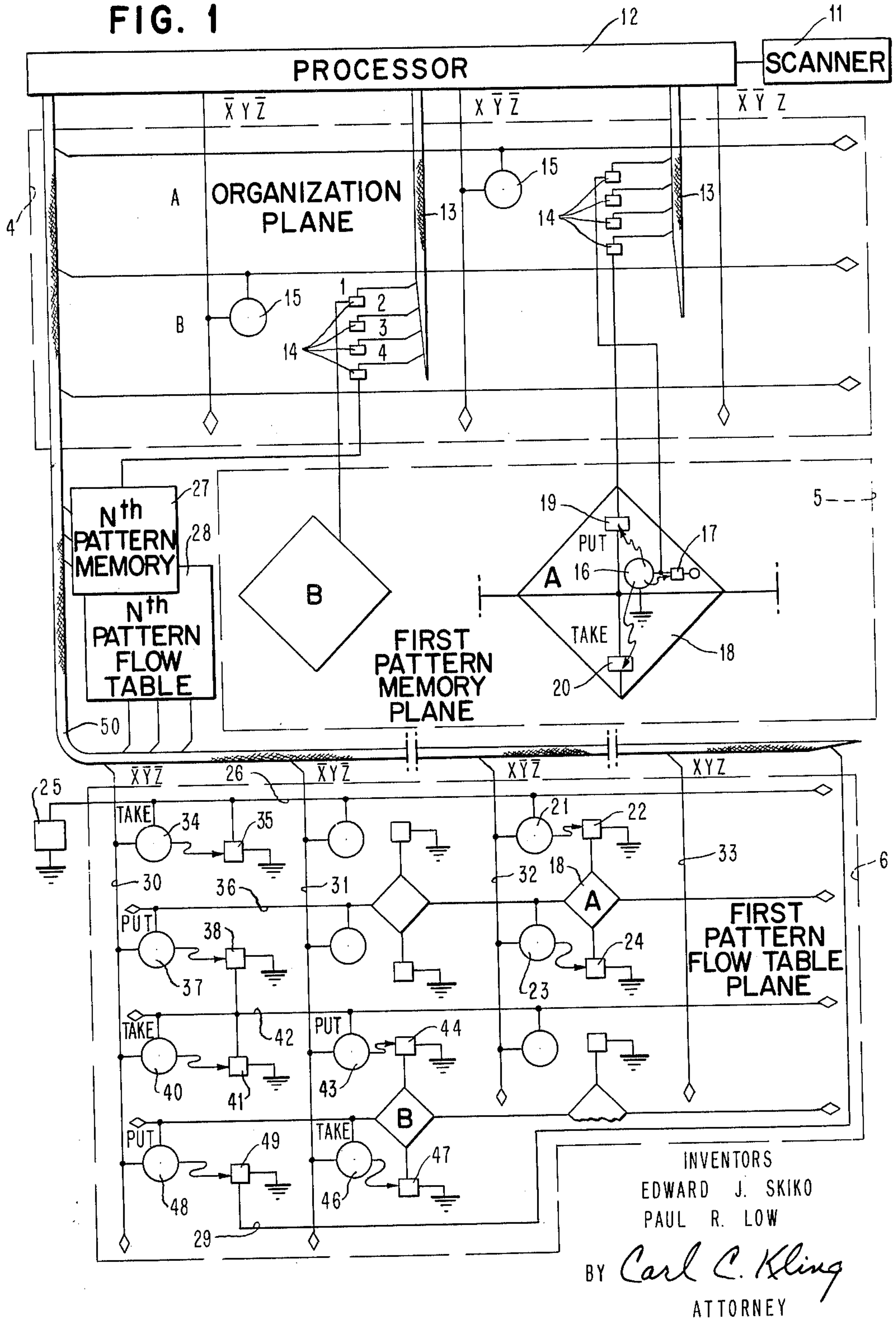
FIG. 1 is a partially detailed block diagram of the flow table logic pattern recognizer.

*FIG. 1.—Flow table logic pattern recognizer*

The invention provides machine-organizable flow table logic pattern recognition. Scanner 11 and processor 12 provide, during recognition time, a sequence of logical signals (functions of X, Y and Z) which are representative of successive patternettes of the pattern scanned Signals X, Y or Z indicate the presence of a black part of the pattern in a related columnar area being scanned, and OA, OB and OC reflect the sequence history of patternette scans. Signals $\overline{X}$, $\overline{Y}$ or $\overline{Z}$ indicate the presence of a white part of the pattern in the related column. The bar over the designation indicates the complement, or "not function." For example, $\overline{X}$ is "not X," and $\overline{XY}Z$ is "the combination of signals not X and not Y with Z."

During a first organization time, the processor conditions, in sequence, sequential inputs (OA1, OB1 and OC1) and certain of the patternette inputs such as $\overline{X}Y\overline{Z}$, $X\overline{Y}\overline{Z}$ and $\overline{X}\overline{Y}Z$ of the organization plane 4. Conditioning signals thus produced are representative of a first pattern. A memory plane and a related pattern flow table plane are assigned that pattern by conditioning via a line of cable 13 and organization photoconductors 14 clustered about each organization luminor 15. Organization luminors at intersections of conditioned lines luminesce, conditioning selected organization photoconductors 14 to condition related memory luminors 16 in memory plane 5. When conditioned, the memory luminors luminesce, i.e., produce radiation having characteristics required to condition a photoconductor.

Optical coupling and feedback from memory luminor 16 to memory photoconductor 17 sets the memory latch 18. The memory latch includes luminor 16 with regenerative feedback to photoconductor 17, and associated optically coupled twin switching type and bistable type setup photoconductors 19 and 20. The memory latch is illustrated in detail once only; in all other appearances the memory latch is shown as a large diamond.

The operation of the memory latch is as follows:

Luminor 16 (which may be a neon bulb or conventional lamp—or, with appropriate voltages and frequencies, and electroluminescent lamp) is conditioned for momentary luminance. (This conditioning is from processor 12 via the related photoconductor 14–1, which is in turn conditioned, i.e., illumined, by luminor 15.) The momentary luminant flash of luminor 16 momentarily conditions photoconductor 17. The rise of photoconductor 17 conductivity is fairly fast; in contrast its conductivity decay is slow. This slow decay (even when the flash is very fast) provides a path for +V through photoconductor 17 to luminor 16 to flash it a second time. The second flash conditions photoconductor 17, continuing the original flash conditioning so that the second flash merges into continuous luminance. The continuous luminance maintains the latch and illumines associated twin switching type and bistable type circuits activating photoconductors 19 and 20, which connect into the flow table. Setup photoconductor 19, when dark, provides a nominal open circuit. When illuminated, it connects its associated elements as a switching type circuit to transfer stability to its twin bistable type circuit, since setup photoconductor 20 is also illuminated.

SUMMARY OF FLOW TABLE LOGIC

The construction and design of a logical machine is simplified by providing for direct implementation of the flow table into hardware in the form of flow table logic. The logical design and electrical circuit design are complete once the flow table for the machine is complete and the choice of component is made.

The completed, packaged segment of the logical machine is recognizable as a flow table in hardware. The active elements are in two configurations: the flow table logic bistable type circuit and the flow table logic switching type circuit. Each bistable type circuit operates to form a stable state; each switching type circuit transfers a stability condition from one bistable type circuit to another.

A switching type circuit may connect two bistable type circuits which are many sequential steps apart, thus skipping steps—it may also reverse sequence and go back several steps, after which the steps may be repeated. This type of flexible sequence, however, requires special treatment in automatic organization flow table logic.

In hardware, flow table logic comprises a plurality of horizontal conductors (such as 26, 36, 42 and 45) and a plurality of vertical conductors (such as 30, 31, 32 and 33) generally in checkerboard or grid pattern. The vertical conductors are insulated from the horizontal conductors. The vertical conductors correspond to the left line of the related columns in the flow table; the horizontal conductors correspond to the top line of the related flow table rows. In the figures, conductors terminate in small diamonds which may be thought of as insulated posts.

The flow table logic bistable type circuit is a stable circuit such as a regenerative bistable device connected across the related column conductor and row conductor at their intercept point and placed within the block designated as a stable state block. The bistable type circuit, depending upon the component chosen, utilizes self-latching characteristics or regenerative feedback to take and retain one of two stable states, which are herein designated "conditioned" and "deconditioned," and maintains the related row conductor conditioned or deconditioned.

Luminor 21 and photoconductor 22 thus form a switching type circuit to transfer stability to luminor 23 and photoconductor 24, which together form a stable latch. This bistable type circuit is operative when its associated memory latch is set; otherwise it is quiescent, its photoconductor leg an open circuit. Organization control is provided from the processor via the organization and memory planes. A memory latch is provided for every possible position of quiescent twin switching type bistable type circuits; when set, the latch activates its related circuit.

A "no patternette" column is effective between sequential patternette recognitions to retain stability of the sequential circuit at intermediate points in the sequence. In the preferred embodiment as shown, column lines are provided for possible patternette functions of X, Y and Z; the no-patternette column line for $\bar{X}\bar{Y}\bar{Z}$. With a simple set of rules, this provides for a variable number of patternettes per character, which occurs, for example, in cases of characters I and M in ordinary Roman type.

The rules are:

(1) Each pattern must include a continuous black trace from left to right (or in the direction of scan).

(2) There must be a recognizable white gap between patterns; successive patterns may not overlap or be subject, in worst cases of skewed scanning, to simultaneous scanning of black. Such overlapping patterns, such as "ffi," may of course be treated as unitary patterns which fulfill the rules.

(3) The processor must distinguish for itself the inter-pattern gap, the inter-word gap and any longer gap. On all but inter-pattern gaps, all patternette lines including $\bar{X}\bar{Y}\bar{Z}$ must be deconditioned momentarily, to clear the pattern flow table planes. Special pattern recognizers for the short and long gaps $\bar{X}\bar{Y}\bar{Z}$, $\bar{X}\bar{Y}\bar{Z}$–$\bar{X}\bar{Y}\bar{Z}$ and $\bar{X}\bar{Y}\bar{Z}$–$\bar{X}\bar{Y}\bar{Z}$ . . . $\bar{X}\bar{Y}\bar{Z}$, although feasible do not appear justified.

(4) There must be a gap to the left of the first pattern.

As recognition cycles begin, home photoconductor 25 (conditioned by a home luminor 63—FIG. 2) provides nominal ground potential on the home row conductor 26. Any other condition of stability is expelled during an $\bar{X}\bar{Y}\bar{Z}$ 1 interval to be explained in connection with FIG. 2. The no-patternette column is $\bar{X}\bar{Y}\bar{Z}$ and $\bar{1}$.

Other pairs of pattern memory planes and pattern flow table planes (such as Nth pattern memory plane 27 and Nth pattern flow table 28) are organized to recognize each other pattern in the language. At the end of organization time, patterns are scanned by scanner 11, encoded into sequences of patternettes by processor 12 and presented to all flow tables in parallel. When a patternette sequence satisfies a flow table, that flow table returns its pattern recognition signal to the processor via recognition line 29.

The abbreviated flow table in FIG. 1 is shown organized for pattern $X\bar{Y}\bar{Z}$–$\bar{X}Y\bar{Z}$.

Before recognition time begins, processor 12 conditions, during a separate organization time for each pattern, appropriate sequences of patternette signals (functions of X, Y and Z generated by the processor) and sequence marking signals A and B. For the exemplary sequence $X\bar{Y}\bar{Z}$–$\bar{X}Y\bar{Z}$, patternette $X\bar{Y}\bar{Z}$ and sequence marker A set the related memory latch A in memory plane 4. An instant later, patternette $\bar{X}Y\bar{Z}$ and sequence marker B set the related memory latch B. Other memory planes, such as Nth pattern memory plane 27, are also set up, during following organization cycles. The set memory latches A and B each activate twin switching type and bistable type circuits at related points in first pattern flow table plane 6.

As recognition time begins, home photoconductor 25 is conditioned to provide nominal ground potential at home row conductor 26. The first patternette is likely to be a space, or "no patternette," $\bar{X}\bar{Y}\bar{Z}\bar{1}$. A +V no patternette signal appears on column line 30; column lines 31, 32 and 33 remain at (nominal) ground potential. Luminor 34, the only luminor in the flow table connected between +V and ground, luminesces. Optical coupling to photoconductor 35 forms a latch, which maintains row conductor 26 at ground potential, thus retaining a +V to ground circuit through luminor 34 so long as spaces ($\bar{X}\bar{Y}\bar{Z}$) appear.

Following a number of spaces, the $X\bar{Y}\bar{Z}$ signal appears as +V on $X\bar{Y}\bar{Z}$ column line 32. $\bar{X}\bar{Y}\bar{Z}$ column line 30 returns to ground potential, darkening luminor 34. The photoconductive decay of photoconductor 35, however, retains ground potential on first row conductor 26 long enough to flash luminor 21 which has been designated by memory latch 18. Photoconductor 22, responding to the flash of luminor 21, grounds row conductor 36 long enough to flash luminor 23, which is +V conditioned by $X\bar{Y}\bar{Z}$ column line 32.

The flash of luminor 23 conditions photoconductor 24 to form the optical latch and retain ground potential on row conductor 36 during the remainder of the patternette interval.

At the end of the patternette interval, column line $\bar{X}\bar{Y}\bar{Z}$ is conditioned to +V and column line $X\bar{Y}\bar{Z}$ is deconditioned to ground as preparations for the second patternette scan are made. Luminor 37 flashes during the decay of photoconductor 24, conditioning photoconductor 38 and grounding row conductor 42 momentarily. Luminor 40 flashes and forms an optical latch with photoconductor 41, maintaining ground potential on row conductor 42 during the remainder of the no patternette interval.

Upon the following patternette scan, $\bar{X}\bar{Y}\bar{Z}$ column line 30 returns to ground as $\bar{X}Y\bar{Z}$ column line 31 is conditioned. PUT luminor 43 flashes during the decay of photoconductor 41, momentarily illuminating photoconductor 44 to momentarily ground row conductor 45. Luminor 46 flashes, forming with photoconductor 47 an optical latch which retains ground potential on row conductor 45 during the remainder of the scan interval.

As the scan interval ends, $\bar{X}\bar{Y}\bar{Z}$ column line 30 is conditioned as $\bar{X}Y\bar{Z}$ column line 31 returns to ground. During the decay of photoconductor 47, luminor 48 flashes, momentarily illuminating photoconductor 49 to provide a ground potential recognition signal to processor 12 via recognition line 29 and cable 50. More complex pattern flow tables require additional twin flow table logic switching type and bistable type circuits for the $\bar{X}\bar{Y}\bar{Z}$ column, and additional rows of patternette flow table logic switching type bistable type circuit twins, together with associated memory latches. The patternette switching type-bistable type circuit twins are arranged complementary to the no-patternette switching type-bistable type circuit wins. A continuous stability condition moves from the home position through appropriate sequences of no-patternette bistable type circuit—patternette twin switching type-bistable type circuits—no-patternette twin switching type-bistable type circuits, etc., to a final recognition condition. For patternette sequences defining a pattern alien to the flow table, the stability condition is lost when a patternette input appears at a sequential level where a quiescent twin switching type-bistable type circuit awaits in the related patternette column, or where the sequential level is beyond that defining the pattern.

Figure 2:
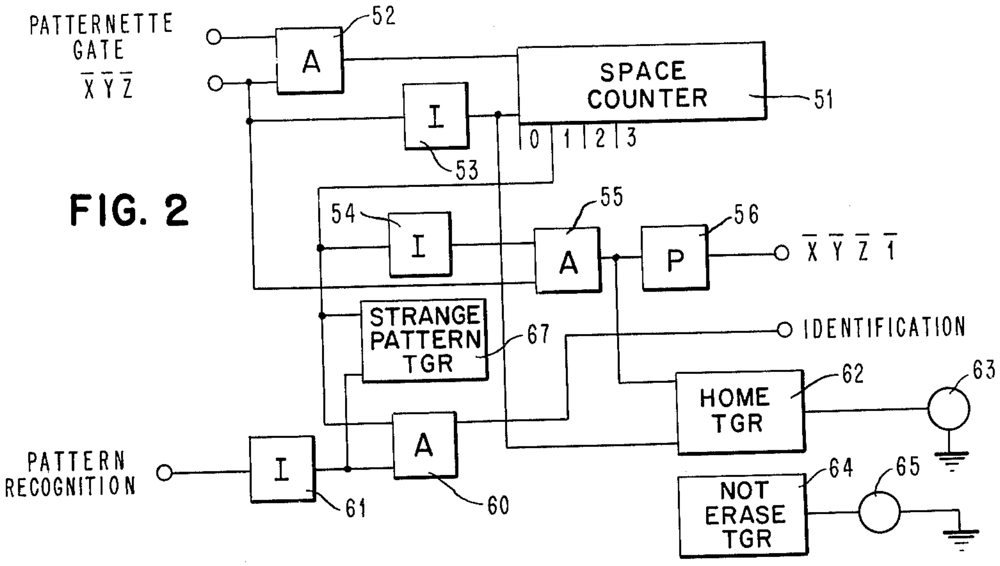
FIG. 2 is a logic diagram for pattern identification circuits associated with the processor.

*FIG. 2.—Pattern identification circuits*

Certain patterns may be completely contained within others, as P in R, O in Q, and I in B, D, E, F, H, K, L, M, N, P, R, and T. The signal on line 29 is a RECOGNITION signal, not an IDENTIFICATION. In the cases of P in R and O in Q the flow tables differentiate the rightmost vertical patternettes; the I, however, is more subtle, since it appears early in many characters, late in the T, and twice in H, M and N. By requiring a no-patternette scan as the final act of pattern recognition identity can be determined. The no-patternette column, however, does not differentiate between a "no-patternette scan" and a "no scan." The processor can easily convert from recognition to identification by applying the logic AND to $\bar{X}$, $\bar{Y}$, $\bar{Z}$ and RECOGNITION.

FIG. 2 illustrates a space counter 51, which counts spaces (Patternette Gate and $\bar{X}\bar{Y}\bar{Z}$) for whatever use the processor intends. AND circuit 52 provides count inputs. Inverter 53 resets the counter at the end of any succession of spaces, by the logic $\bar{\bar{X}}\bar{\bar{Y}}\bar{\bar{Z}}$ which is any patternette other than $\bar{X}\bar{Y}\bar{Z}$.

Upon the first space count, the $\bar{X}\bar{Y}\bar{Z}\bar{1}$ column line is deconditioned by inverter 54 and AND 55, which decondition power block 56. This causes all pattern flow tables to lose their stability condition, preventing completion of a partial pattern by a first part of the following pattern. The $\bar{X}\bar{Y}\bar{Z}\bar{1}$ line is always conditioned during recognition except during the $\bar{X}\bar{Y}\bar{Z}1$ count of the first scanned gap between characters, and actual patternette scans.

Space count 1 also conditions one input of identification AND circuit 60; the other input is subject to the pattern recognition signal on line 29, set to AND operating level by inverter 61. Even though luminor 48 (FIG. 1) darkens as $\bar{X}\bar{Y}\bar{Z}\bar{1}$ line is grounded, the decay of photoconductor 49 provides signal for sufficient time to operate the logic and present an identification signal for the appropriate pattern to the processor.

AND circuit 55 passes the $\bar{X}\bar{Y}\bar{Z}\bar{1}$ signal to HOME trigger 62, which conditions home luminor 63. The home luminor grounds the first row conductor of each of the pattern flow table planes via an associated photoconductor (such as 25 in FIG. 1). Similarly, at the start of organization time for each pattern, the processor sets NOT-ERASE trigger 64, which conditions not-erase luminor 65 continuously during recognition. The not erase luminor conditions photoconductor 66 (FIG. 5) continuously.

Strange pattern trigger 67, which is connected to be set by the rise of the space count 1 signal, is held reset by the recognition signal output of inverter 61. The processor, with such early warning of non-recognition, can record the location of the strange pattern and proceed. If other patterns are also strange, it can backspace and rescan for a second try at recognition, and, upon subsequent non-recognition, reorganize the set of pattern flow tables for another pattern language. Such reorganization can be repeated, either under operator control or by trial and retrial, until the strange pattern is recognized, or determined to be unrecognizable.

As an alternative to the identified circuits above, the identification problem may be simplified by providing for a definite number, for example, seven, scans per pattern. All flow tables can then have a maximum of seven patternette twin PUT-TAKE circuits; a strange pattern is inferred by non-recognition at scan 7, while recognition at scan 7 provides identification directly.

*FIG. 3.—Random pattern*

FIG. 3*a* illustrates a random pattern which is followed through the remaining figures. Its sequence of organization signals is:

A $X\bar{Y}\bar{Z}$
B $\bar{X}Y\bar{Z}$
C $\bar{X}Y\bar{Z}$
D $\bar{X}YZ$

The sequence of signals for recognition is:

$\bar{X}\bar{Y}\bar{Z}$
  $X\bar{Y}\bar{Z}$
$\bar{X}\bar{Y}\bar{Z}$
  $\bar{X}Y\bar{Z}$
$\bar{X}\bar{Y}\bar{Z}$
  $\bar{X}Y\bar{Z}$
$\bar{X}\bar{Y}\bar{Z}$
  $\bar{X}YZ$
$\bar{X}\bar{Y}\bar{Z}$ Although there are no sequence marking signals, the sequence during recognition is explained as:

1. (Home) $\bar{X}\bar{Y}\bar{Z}$
  (2) $X\bar{Y}\bar{Z}$
    (A)
  2 $X\bar{Y}\bar{Z}$
3. (A+) $\bar{X}\bar{Y}\bar{Z}$
(3.) (B−) $\bar{X}\bar{Y}\bar{Z}$
  4 $\bar{X}Y\bar{Z}$
    (B)
  (4) $\bar{X}Y\bar{Z}$
5 (B+) $\bar{X}\bar{Y}\bar{Z}$
(5) (C−) $\bar{X}\bar{Y}\bar{Z}$
  6 $\bar{X}Y\bar{Z}$
    (C)
  (6) $\bar{X}Y\bar{Z}$
7 (C+) $\bar{X}\bar{Y}\bar{Z}$
(7) (D−) $\bar{X}\bar{Y}\bar{Z}$
  8 $\bar{X}YZ$
    (D)
  (8) $\bar{X}YZ$
9 (D+) $\bar{X}\bar{Y}\bar{Z}$ (RECOGNITION)

The usual flow table designations are retained in FIG. 3C; the circled number is a stable point and the corresponding uncircled number is an unstable point leading to its number-related stable point.

*FIG. 4.—Organization Plane*

Organization signals are applied separately as follows:

A $X\bar{Y}\bar{Z}$
B $\bar{X}Y\bar{Z}$
C $\bar{X}Y\bar{Z}$
D $\bar{X}YZ$

The sequence is not critical, so long as the appropriate lines are conditioned in pairs to provide conditioning to luminors A, B, C and D. The processor applies +V at the 1 terminal of board 71, which provides +V through the conditioned 1 photoconductors to the related terminals 72 in the memory plane. During organization cycles for other patterns, terminals 2, 3, 4 (or N) are energized. The electrically opposite side of each photoconductor connects to a terminal 72 in FIG. 5.

*FIG. 5.—Memory plane*

The +V signal at a terminal 72 flashes the appropriate luminor. The latching of luminor 16 and photoconductor 17 has previously been explained in connection with FIG. 1.

Luminors A, B, C and D latch through related photoconductors, forming memory latches A, B, C and D of the flow table.

*FIG. 6.—Random pattern recognition flow table plane*

The action of the random pattern recognition flow table plane has been previously explained in detail in connection with FIG. 1, through flow table logic twin switching type-bistable type circuit B. Signals $\bar{X}\bar{Y}\bar{Z}$-$X\bar{Y}\bar{Z}$-$\bar{X}\bar{Y}\bar{Z}$-$\bar{X}Y\bar{Z}$ moved the stability condition to circuit B.

As the patternette input returned to $\bar{X}\bar{Y}\bar{Z}$ at this point in FIG. 1, the recognition signal was produced. In the complete flow table of FIG. 6, luminor 48 flashes, illuminating photoconductor 75, which grounds row conductor 76 momentarily. The momentary ground flashes luminor 77 which latches with photoconductor 78 to hold the row conductor at ground during the B+ C− interval between scans.

The next patternette signal $\bar{X}Y\bar{Z}$, flashes C luminor 79, conditioning photoconductor 80 to ground row conductor 81. Ground potential on conductor 81 conditions luminor 82 ($\overline{X}$ Y $\overline{Z}$ is still on) which latches through photoconductor 83, holding conductor 81 at ground.

Stability flashes through C+ luminor 84 and photoconductor 85 to ground conductor 86 momentarily; stability then passes to D− luminor 87 which latches via photo-conductor 88, retaining ground on conductor 86 during the no-patternette interval between scans.

The next patternette signal, $\overline{X}$ Y $\overline{Z}$, flashes PUT luminor 89, momentarily grounding via photoconductor 90, the D row conductor 91. Stability passes to D luminor 92 and photoconductor 93, which latch, holding D row conductor 91 at ground potential for the remainder of the scan.

At the end of the scan, $\overline{X}$ $\overline{Y}$ $\overline{Z}$ $\overline{1}$ column line 30 is conditioned. Since the logic of this column line is $\overline{X}$ $\overline{Y}$ $\overline{Z}$, and the $\overline{1}$ merely a "not reset" condition, line 30 is generally called $\overline{X}$ $\overline{Y}$ $\overline{Z}$ line. Luminor 92 flashes, momentarily conditioning photoconductor 93 to provide a ground potential signal on recognition line 94. The recognition signal passes to the circuit shown in FIG. 2, where it is checked against a following $\overline{X}$ $\overline{Y}$ $\overline{Z}$ scan. If the following space is present, identification is made; if the space is absent, further patternette signals drive stability out the bottom of the FIG. 6 flow table.

Upon identification, or upon failure to identify, the $\overline{X}$ $\overline{Y}$ $\overline{Z}$ 1 cycle routine is followed. All patternette and no-patternette lines are deconditioned; the home luminor conditions a home photoconductor 25 in each pattern flow table. The flow tables are thus reset and homed for the next recognition attempt.

The invention has been shown utilizing photologic in the pattern flow table planes. Various other components including for example relays, semi-conductors, superconductors and magnetic cores can be effective. The basic requirement of the component for a switching type circuit is that it be subject to a column input and row input, to provide conditioning to a related bistable type circuit. The bistable type circuit must be subject to a column input and the output of a related switching type circuit to take and hold a measurable condition of stability.

Similarly, other components of the latching variety can replace the optical latches in the memory plane, and other components of the switchable variety substitute for the twin photoconductors.

Additional flexibility can be imparted to the flow table planes by placing two half memory latches between two adjacent row conductors in a given column, so that a given general flow table logic block can be activated as a switching type circuit or as a bistable type circuit selectively.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An automatic organizing pattern recognizer comprising:

(a) a processor for defining a plurality of organization cycles and a plurality of recognition cycles and for producing, during a first such organization cycle, a series of patternette signals, sequence marking signals, and organization rank signals;

(b) an organization plane of multiple-selection switching devices connected to said processor, each subject to selection by said patternette and sequence marking signals;

(c) first and second ranks of organization coupling devices grouped about said multiple-selection switching devices, subject to conditioning by said switching devices to conduct the appropriate organization rank signal;

(d) a first memory plane of variable resistance conditioning devices coupled to respective multiple-selection switching devices of said organization plane by said first rank of organization coupling devices;

(e) a first pattern recognition flow table plane for responding to a first sequence of patternette signals, having a multiplicity of quiescent flow table logic circuits each including a variable resistance means electrically connected to activate a flow table logic switching type or bistable type circuit when conditioned, and included in the respectively related variable resistance conditioning devices of said first memory plane, and a first pattern recognition output means;

(f) a second memory plane of variable resistance conditioning devices coupled to respective multiple-selection switching devices of said organization plane by said second rank of organization coupling devices;

(g) a second pattern recognition flow table plane for responding to a second sequence of patternette signals, having a multiplicity of quiescent flow table logic circuits each including a variable resistance means electrically connected to activate a flow table logic switching type or bistable type circuit when conditioned, each coupled to the respectively related variable resistance conditioning devices of said second memory plane, and a second pattern recognition output means;

(h) a scanner connected to said processor, and through said processor to said first and second pattern recognition flow table planes in the form of a sequence of patternette signals;

whereby, during first and second organization cycles, said first and second pattern recognition flow table planes are each organized to respond to a particular sequence of patternette signals by conditioning the respective recognition output means; and, thereafter, during a recognition cycle, said first and second pattern recognition flow table planes are subjected to a sequence of patternette signals which, if corresponding to the setting of one of said pattern flow table planes, triggers a recognition signal at the related output means.

2. An automatic organizing sequential signal recognizer comprising:

a plane having a plurality of switching devices, a plurality of memory planes, each having a plurality of memory latches subject during a related organization cycle to setting by a related switching device, and a plurality of matrices each comprising a multiplicity of quiescent switching type and bistable type circuits associated directly with a related memory latch in a related memory plane, whereby a memory latch, when set, activates the related circuits for subsequent recognition cycles.

3. An automatic organizing flow table logic device comprising:

(a) means having a set of column conductors including a first column conductor and second column conductor, which first and second column conductors are related to input variable, a set of row conductors, including a first row conductor and a second row conductor, each row conductor traversing all of the column conductors to form a matrix of intercept points including at least a first intercept point and a second intercept point in the same column, circuit means forming quiescent flow table logic switching type and bistable type circuits, respectively, at such first intercept point and at a second intercept point in the same column;

(b) said circuit means including externally conditionable variable resistance means coupled to and arranged to activate said quiescent flow table logic switching type and bistable type circuits when conditioned;

(c) means consisting of externally settable variable resistance conditioning devices coupled to and arranged to condition respective variable resistance means when set; and (d) means coupled to and arranged to set selected ones of said variable resistance conditioning devices.

4. An automatic organizing flow table logic device comprising:

(a) means having a set of column conductors including a first column conductor and second column conductor, which first and second column conductors are related to input variables, a set of row conductors, including a first row conductor and a second row conductor, each row conductor traversing all of the column conductors, to form a matrix of intercept points including at least a first intercept point and a second intercept point in the same column, circuit means forming quiescent flow table logic switching type and bistable type circuits, respectively, at such first intercept point and at a second intercept point in the same column;

(b) said circuit means including externally conditionable variable resistance means coupled to and arranged to activate said quiescent flow table logic switching type and bistable type circuits when conditioned;

(c) a plane of externally settable variable resistance conditioning devices coupled to and arranged to condition respective variable resistance means when set; and (d) a plane of multiple-selection switching devices, coupled respectively to said variable resistance conditioning devices and arranged to set selected ones of the variable resistance conditioning devices in said memory plane (c).

5. An automatic organizing flow table logic device comprising:

(a) a matrix having a set of column conductors including a first column conductor and a second column conductor, which first and second column conductors are related to input variables, a set of row conductors including a first row conductor and a second row conductor, each row conductor traversing all of the column conductors, each row conductor most nearly approaching each column conductor at a single intercept point, and general flow table logic circuit means forming quiescent flow table logic switching type and bistable type circuits, respectively, at such an intercept point and at a second intercept point in the same column, (b) said circuit means comprising—

(1) a first luminor connected across a first intercept point, a first photoconductor optically coupled to said first luminor and electrically coupled to ground, and a first variable resistance means electrically coupled to said first photoconductor and to a second row conductor alien to said first intercept point, whereby conditioning of said variable resistance means completes a flow table logic switching type circuit; and (2) a second luminor connected across a second intercept point in the same column as said first intercept point;

a second photoconductor optically coupled to said second luminor and electrically coupled to ground;

and a second variable resistance means electrically coupled to said second photoconductor and to said second row conductor, whereby conditioning of said variable resistance means completes a flow table logic bistable type circuit;

(c) a plane of externally settable variable resistance conditioning devices coupled to and arranged to condition respective variable resistance means when set; and (d) a plane of multiple-selection switching devices coupled respectively to said variable resistance conditioning devices and arranged to set selected ones of the variable resistance conditioning devices in said plane (c).

6. An automatic organizing flow table logic device comprising:

(a) a matrix having a set of column conductors including a first column conductor and second column conductor, which first and second column conductors are related to input variables, a set of row conductors including a first row conductor and a second row conductor, each row conductor traversing all of the column conductors, each row conductor most nearly approaching each column conductor at a single intercept point, and general flow table logic circuit means forming quiescent flow table logic switching type and bistable type circuits, respectively, at such an intercept point and at a second intercept point in the same column;

(b) said circuit means comprising—

(1) a first luminor connected across a first intercept point, a first photoconductor optically coupled to said first luminor and electrically coupled to ground, and a first photo-variable resistance electrically coupled to said first photoconductor and to a second row conductor alien to said first intercept point whereby conditioning of said photo-variable resistance means completes a flow table logic switching type circuit, and (2) a second luminor connected across a second intercept point in the same column as said first intercept point;

a second photoconductor optically coupled to said second luminor and electrically coupled to ground, and a second photo-variable resistance electrically coupled to said second photoconductor and to said second row conductor whereby conditioning of said variable resistance means completes a flow table logic bistable type circuit;

(c) a plane of externally settable optical bistable devices each including a luminor and a photoconductor mutually coupled electrically and optically, said luminor being optically coupled to a related photo-variable resistance; and (d) a plane of multiple selection switching devices coupled respectively to said optical bistable devices.

7. An automatic organizing flow table logic device comprising:

(a) a matrix having a set of column conductors including a first column conductor and a second column conductor, which first and second column conductors are related to input variables, a set of row conductors including a first row conductor and a second row conductor, each row conductor traversing all of the column conductors, each row conductor most nearly approaching each column conductor at a single intercept point, and general flow table logic circuit means forming quiescent flow table logic switching type and bistable type circuits, respectively, at such an intercept point and at a second intercept point in the same column;

(b) said circuit means comprising—

(1) a first luminor connected across a first intercept point, a first photoconductor optically coupled to said first luminor and electrically coupled to ground, and a first photo-variable resistance electrically coupled to said first photoconductor and to a second row conductor alien to said first intercept point whereby conditioning of said photo-variable resistance means completes a flow table logic switching type circuit; and (2) a second luminor connected across a second intercept point in the same column as said first intercept point, a second photoconductor optically coupled to said second luminor and electrically coupled to ground, and a second photo-variable resistance electrically coupled to said second photoconductor and to said second row conductor, whereby conditioning of said variable resistance means completes a flow table logic bistable type circuit;

(c) a plane of externally settable variable resistance conditioning electro-optical bistable devices each including a luminor and a photoconductor mutually coupled electrically and optically, said luminor being optically coupled to a related photo-variable resistance;

(d) a plane including a matrix of mutually insulated row and column conductors, a set of coupling photoconductors respectively related to the intercept points of the matrix and a set of multiple selection switching luminors connected across said row and column conductors at respective intercept points, optically coupled to said variable resistance conditioning optical bistable devices via said coupling photoconductors.

8. An automatic organizing flow table logic device comprising:

(a) a first matrix and a second matrix each having a set of column conductors including a first column conductor and a second column conductor, which first and second column conductors are related to input variables, a set of row conductors, including a first row conductor and a second row conductor, to form a conductor traversing all of the column conductors, each row matrix of intercept points including at least a first intercept point and a second intercept point in the same column circuit means forming quiescent flow table logic switching type and bistable type circuits, respectively, at such an intercept point and at a second intercept point in the same column, said circuit means including externally conditionable variable resistance means coupled to and arranged to activate flow table logic switching type and bistable type circuits when conditioned;

(b) first and second means each consisting of externally settable variable resistance conditioning devices coupled to and arranged to condition respective variable resistance means when set; and (c) means coupled to and arranged to set selected ones of said variable resistance conditioning devices;

(d) first and second ranks of coupling devices grouped about multiple selection switching devices, each said coupling device in said first rank being subject to conditioning during a first organization cycle by a related multiple-selection switching device to set the related variable resistance conditioning device in said first means (b) to condition variable resistance means, and each coupling device in said second rank being subject to conditioning during a second organization cycle by a related multiple-selection switching device, to set the related variable resistance conditioning device in said second means (b) to condition variable resistance means;

(e) whereby the first and second means to condition variable resistance means are subject to organization during first and second organization cycles, respectively, each to respond to a particular setting of said means (c) coupled by conditioning selected variable resistance means in the said first matrix and said second matrix, respectively, after which first and second organization cycles said first and second matrices are prepared to accomplish sequential switching per the organization.

9. An automatic organizing pattern recognizer comprising:

(a) a processor for defining a plurality of organization cycles and a plurality of recognition cycles and for producing, during a first such organization cycle, a series of patternette signals, sequence marking signals, and organization rank signals;

(b) a plane of multiple-selection switching devices connected to said processor, each subject to selection by said patternette and sequence marking signals;

(c) first and second ranks of coupling devices grouped about said multiple-selection switching devices, subject to conditioning by said switching devices to conduct the appropriate organization rank signal;

(d) a first plane of variable resistance conditioning devices coupled to respective multiple-selection switching devices of said organization plane by said first rank of organization coupling devices;

(e) a first matrix for responding to a first sequence of patternette signals, comprising—

(1) a no-patternette column line defining a no-patternette column, (2) a plurality of differing patternette column lines defining respective patternette columns, (3) a home row conductor defining a home row, (4) a plurality of sequence row conductors defining respective sequence rows, (5) a flow table logic bistable type circuit in the no-patternette column and home row, (6) flow table logic switching type and bistable type circuit in pairs grouped across alternate sequential row conductors in sequential rows of said no-patternette column, (7) a plurality of variable resistance selected flow table logic switching type-bistable type circuit pairs in various columns grouped across alternate sequence row conductors, each no-patternette switching type circuit sharing a row with a patternette bistable type circuit, and each no-patternette bistable type circuit sharing a row with a patternette switching type circuit, whereby the sequence of switching for pattern recognition is:

| | |
|---|---|
| (home) | no-patternette stability |
| | patternette switching |
| | patternette stability |
| | no-patternette switching |
| | no-patternette stability |
| | patternette switching |
| | patternette stability |
| (recognition) | no-patternette switching |

(f) a second plane of variable resistance conditioning devices coupled to respective multiple-selection switching devices of said organization plane by said second rank of organization coupling devices;

(g) a second matrix for responding to a second sequence of patternette signals, having a multiplicity of quiescent flow table log circuits each including a variable resistance means electrically connected to activate a flow table logic switching type or bistable type circuit when conditioned, each coupled to the respectively related variable resistance conditioning devices of said second plane of variable resistance conditioning devices, and a second pattern recognition output means;

(h) a scanner connected to said processor, and through said processor to said first and second matrices in the form of a sequence of patternette signals;

whereby, during first and second organization cycles, said first and second matrices are each organized to respond to a particular sequence of patternette signals by conditioning the respective recognition output means; and, thereafter, during a recognition cycle, said first and second matrices are subjected to a sequence of patternette signals which, if corresponding to the setting of one of said matrices, triggers a recognition signal at the related output means.

10. An automatic organizing pattern recognizer according to claim 9, wherein said multiple-selection switching devices are luminors, said first and second ranks of coupling devices are photoconductors, said variable resistance conditioning devices are luminors, and said variable resistance means are photoconductors.

References Cited by the Examiner

UNITED STATES PATENTS

| | | | |
|---|---|---|---|
| 2,967,265 | 1/1961 | Diemer et al. | 340—166 |
| 3,019,349 | 1/1962 | Sanborn | 340—173.1 |

DARYL W. COOK, *Acting Primary Examiner.*

STEPHEN W. CAPELLI, IRVING L. SRAGOW, *Examiners.*

S. M. URYNOWICZ, J. E. SMITH, *Assistant Examiners.*